(12) United States Patent
Narusawa et al.

(10) Patent No.: US 7,769,476 B2
(45) Date of Patent: Aug. 3, 2010

(54) DATA REPRODUCING SYSTEM AND DATA STREAMING SYSTEM

(75) Inventors: Sadayuki Narusawa, Hamamatsu (JP); Tetsuya Matsuyama, Hamamatsu (JP); Masatoshi Kawashima, Hamamatsu (JP); Hiroaki Furuta, Hamamatsu (JP); Katsuaki Tanaka, Hamamatsu (JP); Yasuhiro Matsunuma, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 948 days.

(21) Appl. No.: 10/991,823

(22) Filed: Nov. 17, 2004

(65) Prior Publication Data

US 2005/0138666 A1 Jun. 23, 2005

(30) Foreign Application Priority Data

Nov. 18, 2003 (JP) ............................ P2003-388348

(51) Int. Cl.
G06F 17/00 (2006.01)
H04J 3/06 (2006.01)
H04L 7/00 (2006.01)
H04L 25/40 (2006.01)

(52) U.S. Cl. .......................... 700/94; 370/516; 375/372
(58) Field of Classification Search ................. 370/516; 375/372; 700/94
See application file for complete search history.

(56) References Cited

U.S. PATENT DOCUMENTS

| 5,699,481 A | * | 12/1997 | Shlomot et al. | ............. 704/228 |
|---|---|---|---|---|
| 5,809,454 A | * | 9/1998 | Okada et al. | ................ 704/214 |
| 5,822,537 A | * | 10/1998 | Katseff et al. | ............... 709/231 |
| 5,825,771 A | * | 10/1998 | Cohen et al. | ................ 370/394 |
| 6,151,076 A | * | 11/2000 | Hoffman et al. | ............ 348/512 |
| 6,249,810 B1 | * | 6/2001 | Kiraly | ......................... 709/217 |
| 6,347,380 B1 | * | 2/2002 | Chang et al. | ................ 713/503 |
| 6,377,931 B1 | * | 4/2002 | Shlomot | ..................... 704/503 |
| 6,665,751 B1 | * | 12/2003 | Chen et al. | .................... 710/52 |
| 6,901,368 B1 | * | 5/2005 | Ono | ........................... 704/500 |
| 2002/0040403 A1 | | 4/2002 | Goldhor | |
| 2003/0167170 A1 | * | 9/2003 | Andrsen et al. | ............. 704/270 |
| 2004/0141576 A1 | * | 7/2004 | Sonoda | ........................ 375/372 |

FOREIGN PATENT DOCUMENTS

JP 09-261613 10/1997

OTHER PUBLICATIONS

Integration of Error Recovery and Adaptive Playout for Enhanced Multicast Media Streaming, Jinyong Jo, Networked Media Lab, Department of Information and Communications.
Intrastream Synchronization for Continuous Media Streams: A Survey of Playout Schedules, Nikolas Laotaris, Department of Informatics & Telecommunications, University of Athens.

(Continued)

*Primary Examiner*—Curtis Kuntz
*Assistant Examiner*—Jesse A Elbin
(74) *Attorney, Agent, or Firm*—Morrison & Foerster LLP

(57) ABSTRACT

A data reproducing system includes: a receiver that receives streaming data via a network; a buffering device that buffers the received data; a reproducing unit that reproduces the data by reading the data from the buffering device; and a controller that controls a reproducing speed of the reproducing unit in response to excess and deficiency of an amount of buffer from a predetermined target value to maintain the amount of buffer of the buffering device at the target value.

13 Claims, 6 Drawing Sheets

OTHER PUBLICATIONS

Brochure for MusicCAST Interactive Wireless Home Music Network System, Yamaha Corporation.

Notification of Reasons for Refusal for Japanese Patent Application No. 2003-388348, drafted Dec. 5, 2008 (9 pages).

* cited by examiner

FIG. 5
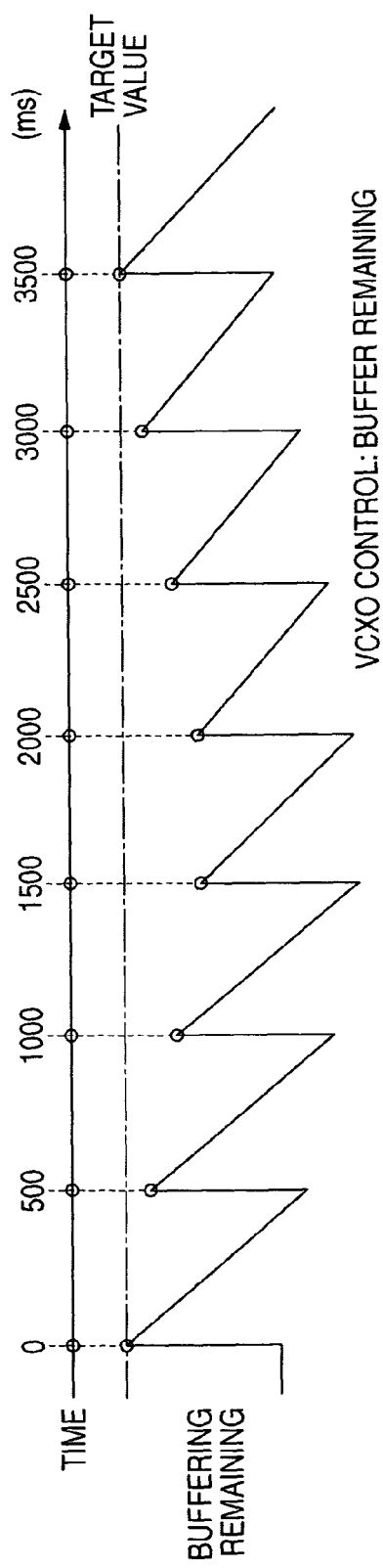
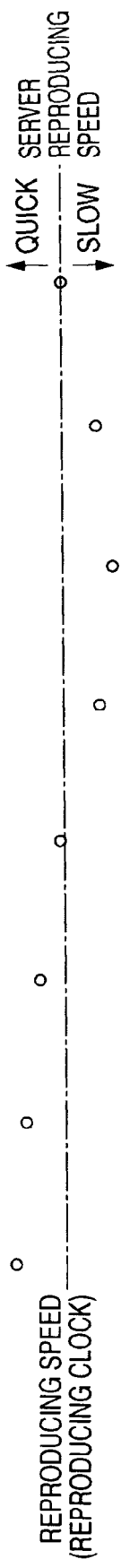

DATA REPRODUCING SYSTEM AND DATA STREAMING SYSTEM

BACKGROUND OF THE INVENTION

The present invention relates to a data streaming system that is capable of streaming data via a network such as LAN to cause a server system and a client system to reproduce data, for example, audio contents such as music.

Such a system was put to practical use that the audio data (music collection) collected by the entire family are stored into one server system and then clients systems provided in respective rooms are connected to the server system via the network, whereby each member of the family in each room of the house can hear arbitrarily the audio data stored in the server system.

Non-Patent Literature 1:

"Music Cast Catalog", (online), August 2002, Yamaha Corporation, (Nov. 11, 2002, Search), on the Internet at yamaha.co.jp/product/av/prd/musiccast/index.

In the above system, each member of the family can hear freely the audio data accumulated in the server system via each of a plurality of client systems in each room. However, such system did not have a broadcast function of sending out the same music to the entire room at the same time at a party, or the like, for example.

Respective clients can receive the audio data that the server system streaming-outputs to the network, and then reproduce such data. In this case, there exists the problems that, since it is difficult for respective client systems to synchronize the reproducing starting timing perfectly and also a reproducing speed of the audio data is varied due to a fluctuation in the oscillation frequency of the clock generator circuit, respective reproduced locations of the music are displaced among respective client systems while the audio data are reproduced.

In order to overcome this displacement, it is considered that absolute times of the clocks in respective client systems are synchronized mutually by incorporating the NTP server (NTP (Network Time Protocol) is a protocol designed to synchronize the clocks of computers over a network) into the network. In this case, there exists the problem that a system configuration becomes complicated to bring about an increase in cost. Further, it is considered that a precision of the clock generator circuit in respective client systems should be improved. In this case, not only a cost of each client system is increased but also it is impossible to perfectly synchronize the progress of the music among respective client systems because there is a limit to improvement of the precision.

SUMMARY OF THE INVENTION

It is an object of the present invention to provide an audio reproducing system and an audio streaming system, which make it possible for a plurality of client systems to reproduce in synchronism audio data that are streaming-output from a server system to a network.

In order to solve the aforesaid object, the invention is characterized by having the following arrangement.

A data reproducing system of the present invention includes:
  a receiver that receives streaming data via a network;
  a buffering device that buffers the received data;
  a reproducing unit that reproduces the data by reading the data from the buffering device; and
  a controller that controls a reproducing speed of the reproducing unit in response to excess and deficiency of an amount of buffer from a predetermined target value to maintain the amount of buffer of the buffering device at the target value.

In the present invention, the reproducing speed is synchronized with the streaming speed of the audio data that are streaming—distributed via the network. In other words, the audio data are buffered up to the target value prior to the reproducing start, and then the reproducing speed is controlled to maintain an amount of buffer at the target value. Therefore, even if the basic clock of the audio reproducing system is different from the data reading speed of the server system as the streaming-distributor, both are mated with each other by the reproducing speed control.

In the case where a plurality of audio reproducing systems are connected to the network, the reproducing speeds of all audio reproducing systems can be synchronized with the streaming speed of the same audio data. Therefore, the music can be reproduced in synchronism with each other.

In this case, although the amount of buffer is different in respective client systems if viewed microscopically on a time axis, the reproducing speed can be mated with the audio data being streamed via the network by maintaining the amount of buffer at the target value, if viewed in broad perspective.

In order to prevent the abrupt control of the reproducing speed, the filtering process may be applied to the parameter indicating the excess and deficiency in the amount of the buffer to give a time constant (inertia). Then, the reproducing speed (clock frequency) may be controlled by the parameter that is subjected to the filtering process.

In the present invention, the means for controlling the reproducing speed controls the reproducing speed within predetermined upper and lower limits of the reproducing speed even if the excess and deficiency of the amount of buffer is increased.

If the reproducing speed is largely changed even in the case where an amount of buffer is extremely increased and extremely decreased, the frequency change occurs to such an extent that the user can discriminate such frequency change through the sense of hearing. Therefore, even if the extreme buffer change is caused, the excess and deficiency is dissolved gradually by controlling the reproducing speed within a predetermined range.

The setting of the upper limit and the lower limit of the reproducing speed can be replaced with the setting of the upper limit and the lower limit of the reproducing speed control parameter (the upper limit and the lower limit of the parameter are decided in the embodiment described later).

In the present invention, the means for controlling the reproducing speed stops the reproducing of the reproducing unit when the deficiency of the amount of buffer in the buffering device is in excess of a predetermined value, and keeps reproducing stop until data are buffered in the buffering device to exceed the target value.

The situation that a lack of an amount of buffer is increased corresponds to a condition that the reproducing position of the audio data in the client system is largely deviated from other client systems and the server system. Therefore, it is not preferable that the reproducing is continued in this situation. As a result, in such case, the buffering of the data is stopped once and executed again, and then the reproducing is restarted after the client system is restored to a state that it can reproduce the data in synchronism with other systems.

An audio streaming system of the present invention comprises a server system for streaming-outputting audio data to a network; and a plurality of audio reproducing systems each of which are set forth in Claim 1, Claim 2, or Claim 3 as a client system.

According to the audio streaming system in this configuration, all the client systems can reproduce the audio data that are streaming-output from the server system onto the network in synchronism.

In the present invention, the server system streaming-outputs the audio data to the network, and buffers data that correspond to a target value of the amount of buffer in the client system and a transmission delay time from the server system to the client system and then reproduce the data.

In the present invention, the audio data are also buffered in the server system by a lag time until the client system receives the audio data to reproduce/output after the audio data are output onto the network, and then reproduced/output. Therefore, not only the client systems but also the server system and the client system can reproduce the audio data in synchronism with each other.

As described above, according to the present invention, in the case where the audio data that are streaming-output from the server system onto the network are to be reproduced simultaneously in a plurality of audio reproducing systems (client systems), if only the process of controlling the reading speed to maintain an amount of buffer of the audio data, which are streaming-distributed (from the server system), at the target value is carried out in the audio reproducing system (client system) without introduction of improvements (improvements in precision of the NTP server and the clock generator circuit) into the hard ware, the reproducing rate of the audio reproducing system can be mated with the streaming rate of the audio data that are streaming-distributed and also the reproducing speed and the reproducing position can be synchronized mutually in all audio reproducing systems even though a plurality of audio reproducing systems are connected to the network.

BRIEF DESCRIPTION OF THE DRAWINGS

FIG. 5 is a chart showing changes in a buffer remaining capacity and a clock frequency in the client system.

DETAILED DESCRIPTION OF PREFERRED EMBODIMENTS

Figure 1:
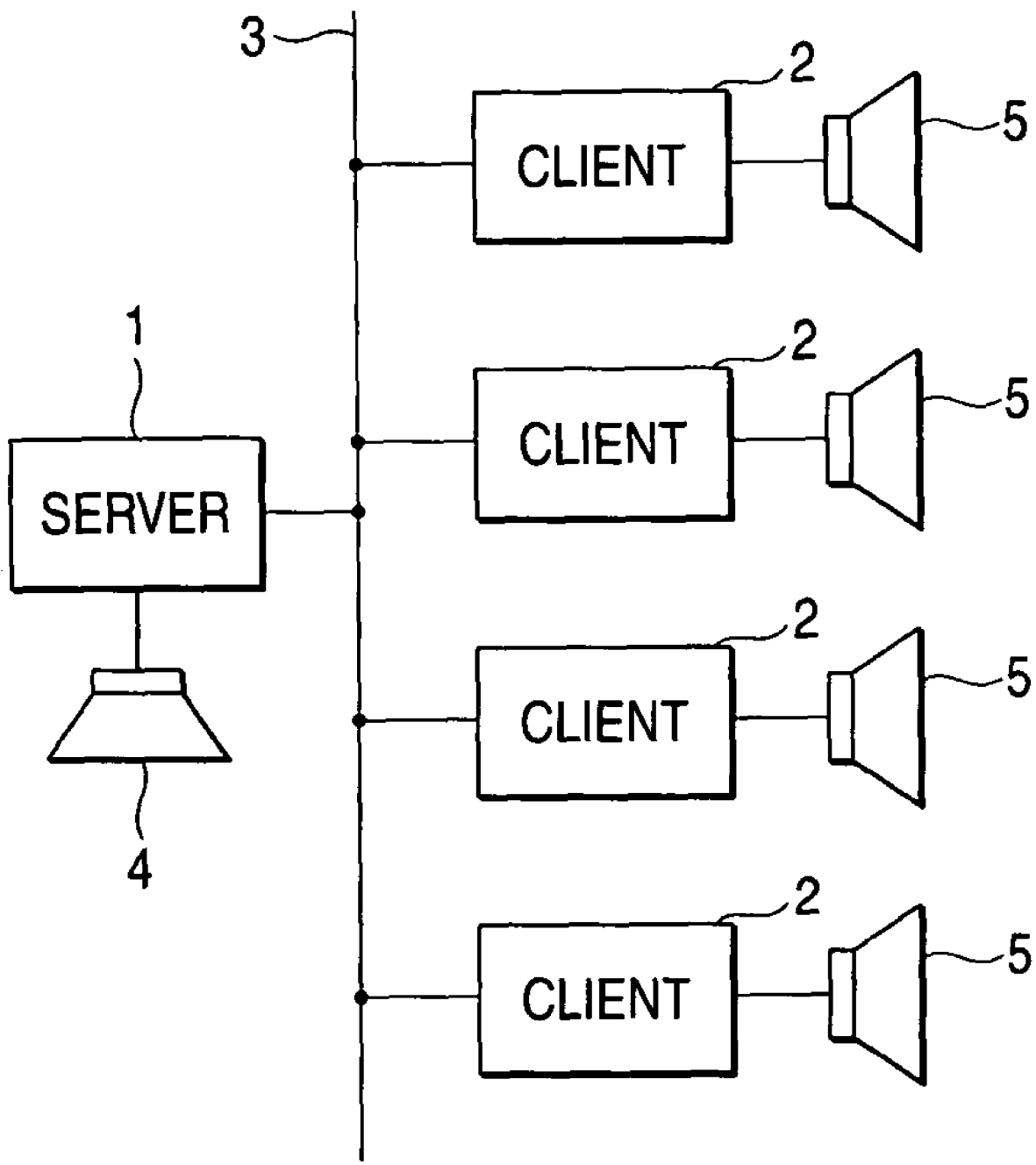
FIG. 1 is a configurative view of an audio streaming system as an embodiment of the present invention.

FIG. 1 is a view showing a configuration of an audio streaming system as an embodiment of the present invention. In this audio streaming system, a server system 1 is connected to a plurality of client systems 2 via a LAN (Local Area Network) 3. The LAN 3 may be constituted by either wired LAN or wireless LAN. In the case that a analog signal source is input from an inside of or an outside of the server system, the server system is provided with an A/D converter (not shown) for digitalizing the analog signal and designed to digitalize the signal before distributing the data to each client system 2 at the latest. A speaker system 4 is connected to the server system 1, and a speaker system 5 is connected to each client system 2. The server system 1 has a built-in storage such as a hard disk, or the like, and stores a large number of digitized audio data (music data) therein.

In the normal reproducing mode, in each client system 2, the user can select the music from the audio data (musical pieces) stored in the server system 1 and reproduce the selected music independently from the server system 1 and other client systems 2. The server system 1 can reproduce the music selected independently. The selection of music is executed by using the infrared remote controller (not shown).

In the broadcast mode, the music selected in the server system 1 is broadcast to all the client systems 2, and thus the same music is reproduced in synchronism in all the client systems 2.

In this embodiment, this broadcast mode will be explained hereunder.

Figure 2:
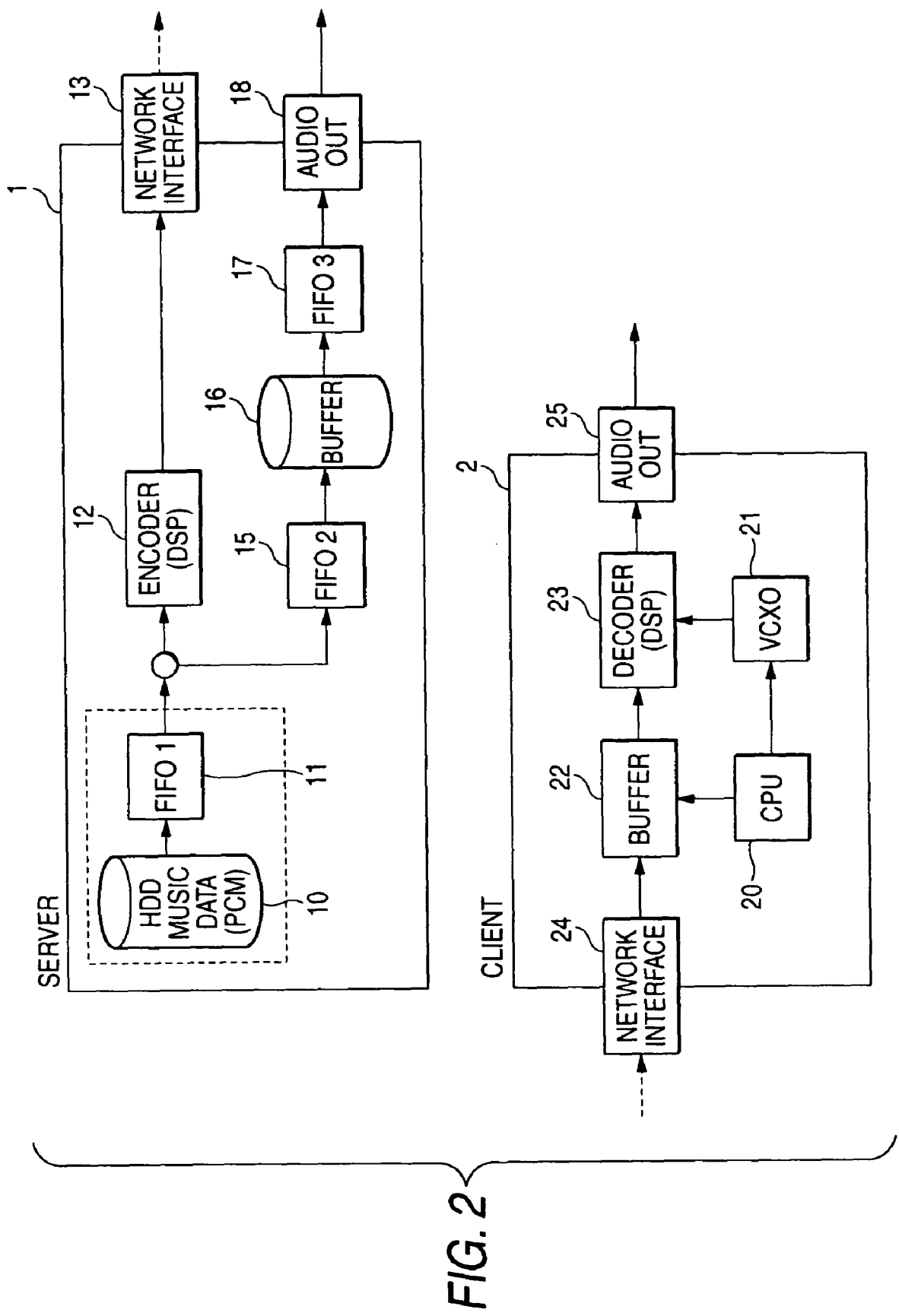
FIG. 2 is a block diagram of a server system and a client system as the embodiment of the present invention.

FIG. 2 is a block diagram of signal path systems of the server system 1 and the client system 2. The server system 1 has a hard disk 10 that accumulates/stores the audio data therein in the linear PCM system. A FIFO 11 is a buffer that is used to control the reading from the hard disk 10.

In the broadcast mode, the audio data of the requested music are read in response to a sampling clock of the server system and then input into an encoder 12. The encoder 12 MP3(MPEG Audio Layer(ISO/IEC 11172-3 and ISO/IEC 13818-3))-compresses the audio data and then input the compressed data into a network interface 13. Incidentally, although the present embodiment employs MP3 to compress the audio data, other audio compression techniques (for example, AC-3, AAC, ATRAC) may be employed to compress the audio data. Further, although, in the above description, the audio data is stored in the hard disk 10 in the linear PCM system, compression data such as MP3 data that is compressed in advance may be stored in the hard disk 10, and both the linear PCM data and MP3 data may be stored therein. The network interface 13 sends out the MP3-compressed audio data to the LAN 3.

The network interface 13 formulates the audio data into a packet every 500 ms and then sends out the packet to the LAN 3.

The server system 1 itself reproduces the audio data that are sent out onto the LAN 3. For this reason, a buffering device (FIFO(2) 15, buffer 16, FIFO(3) 17) buffers the audio data by an amount of buffer and an amount of transmission delay in the client system 2 to delay the data up to the same timing as the reproducing timing in the client system 2, and then the delayed data are input into an audio output circuit 18. The audio output circuit 18 DA-converts and amplifies the audio data and then outputs resultant data to the speaker system 4.

In this case, a quantity of data that are buffered by the buffering device corresponds to a reproducing time of almost 2 sec. But the hard disk is used as the buffer 16 since such data are the linear PCM data.

As described above, this buffer is provided to mate the reproducing timing in the server system 1 with a lag in the reproducing in the client system 2. Thus, an amount of buffer and the transmission delay in the buffer may be decided in response to those in the client system 2. As the transmission delay, throughput in the encoder 12 and the decoder 23, etc. may be considered.

Meanwhile, the client system 2 includes a CPU 20, a VCXO (Voltage Controlled Crystal Oscillator) 21, a buffer 22, a decoder (DSP) 23, a network interface 24, and an audio output circuit 25. The network interface 24 is connected to the LAN 3, and receives the audio data that are output from the server system 1 (and are subjected to the MP3-compression).

In this case, the procedure of transmitting the audio data from the server system 1 to the client system 2 contains the retransmission control. For example, the TCP protocol is employed. As described later, because the audio data are buffered for about 2 sec in the buffer 22, there is hardly a possibility that the buffer under run occurs or the sequence of data is exchanged even though the retransmission process is executed in the TCP procedure. Here, the UDP (User Datagram Protocol) may be employed if the retransmission control is executed in the upper layer.

The audio data received by the network interface 24 are input into the buffer 22. This buffer buffers the audio data for about 2 sec. The buffer 22 accumulates the audio data for about 2 sec, and the accumulated data are read by the decoder 23 in order of older data. A quantity of data being accumulated in the buffer 22 is monitored/controlled by the CPU 20. In this case, since the buffer 22 is used to buffer the data that are MP3-compressed, the semiconductor memory can be used sufficiently as this buffer, unlike the buffer 16 in the server system 1.

The decoder 23 decodes the MP3-compressed audio data, which are read from the buffer 22, into the linear PCM, then converts the decoded data into the analog signal, and then outputs such signal to the audio output circuit 25. This audio output circuit 25 amplifies the audio signal and then outputs the amplified signal to the speaker system 5.

In this client system 2, the CPU 20 monitors an amount of buffer in the buffer 22. Then, a read amount from the buffer 22 is controlled by controlling a clock frequency of the VCXO 21, which supplies a clock signal to the decoder 23, so as to keep an amount of buffer constant (at a target value). This control of the clock frequency of the VCXO 21 is performed within a range in which the user does not sense a frequency variation through the sense of hearing.

In this manner, if an amount of buffer in the buffer 22 is maintained at a predetermined value (target value), the reproducing speed and the reproduced position in the client system can be synchronized with the data output speed and the output timing in the server system 1. In other words, although an amount of buffer is always varied if viewed microscopically on a time axis, an amount of buffer can be maintaining at a predetermined amount on an average to take the synchronization of the reproducing timing, if viewed in broad perspective, because the server system 1 sends out the audio data periodically based on the precise clock signal.

Figure 3:
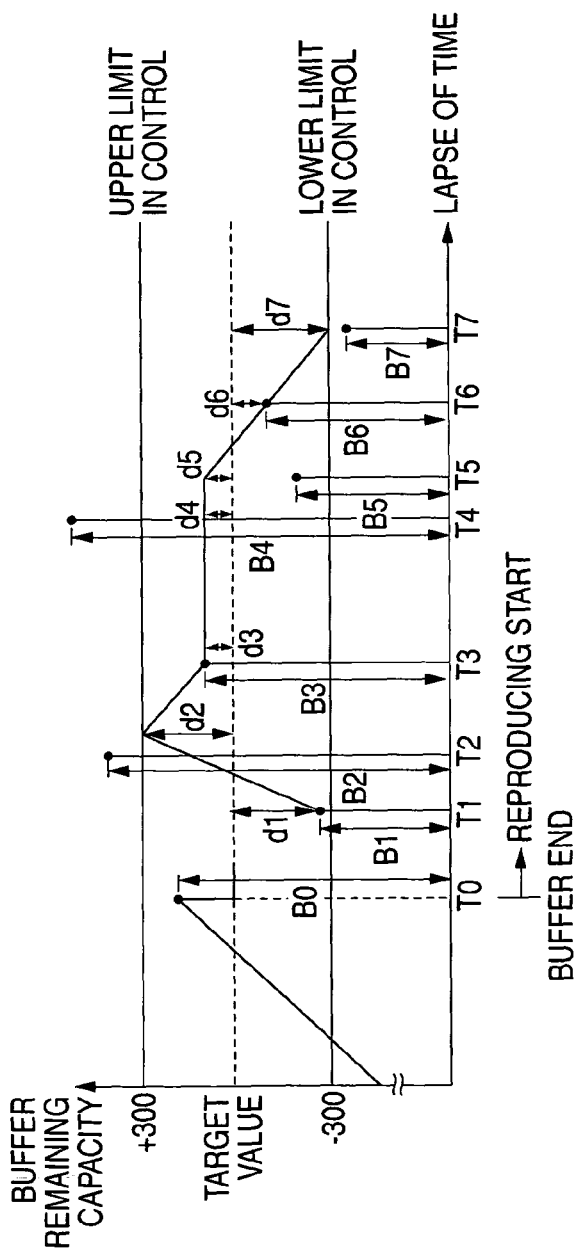
FIG. 3 is a view showing changes in a buffer remaining capacity and a clock frequency in the client system.

FIG. 3 is a view explaining a relationship between a quantity of audio data accumulated in the buffer 22 (buffer remaining capacity) and a clock control parameter. The CPU 20 decides the reproducing speed control parameter such that a remaining capacity of the buffer 22 coincides with the target value.

The CPU 20 receives a group of packets every 500 ms during the reproducing of the music, and checks the buffer remaining capacity every reception. Upon starting the music, the audio data are accumulated in the buffer 22 without reproducing of the music. Then, the reproducing of the audio data are started when the audio data are buffered up to a buffer value B0 that exceeds the target value by a predetermined level (T0). In this case, B0 is given as a level that exceeds the target value of the buffer by an amount of initial consumption of the decoder. The target value of the buffer is decided based on a predetermined reproducing time (2 sec)×a bit rate of MP3.

Then, subsequently a parameter dn is decided in response to a buffer remaining capacity Bn that is checked every about 500 ms. Then, the VCXO 21 is controlled in response to this dn to decide a reproducing speed (clock frequency).

First, at T1, since the buffer remaining capacity is B1 that is lower than the target value, a difference component (a value corresponding to this) from the target value is output as a parameter d1. The VCXO 21 is controlled based on the parameter d1 to slow the clock.

Then, at T2, since a difference component of a buffer remaining capacity B2 from the target value exceeds an upper limit in control (+300 B when the data are encoded at 160 kbps), +300 B (a value corresponding to this) as an upper limit value in control is output as a parameter d2. The VCXO 21 is controlled based on the parameter d2 to quicken the clock.

Then, at T3, since a difference component of a buffer remaining capacity B3 from the target value is within a control range on the + side, this difference component (a value corresponding to this) is output as a parameter d3.

Then, at T4 at which the client system receives a group of packets, since a lapse of time from T3 is delayed to exceed +10% (50 ms) of a normal time interval 500 ms, check result of the buffer remaining capacity at this time is not employed because of an incorrect one. Thus, the parameter decided based on the preceding buffer remaining capacity is used as a parameter d4 as it is.

Then, at T5 at which the client system receives a next group of packets, since a lapse of time from T4 is a shorter interval than −10% of the normal time interval 500 ms, check result (d5) of the buffer remaining capacity at this time is not employed. Thus, the parameter decided based on the preceding (two times ahead in this case) buffer remaining capacity is used as a parameter d5 as it is.

Then, at T6, since a lapse of time from T5 is within a range of ±10% of the normal time interval 500 ms, this check result of the buffer remaining capacity is decided as a reliable value. Then, this difference component (a value corresponding to this) is output as a parameter d6 because the difference component of the buffer remaining capacity from the target value is within the control range.

Then, at T7, since a arrival time of a group of packets is within an allowable time range but a difference component of a buffer remaining capacity B7 from the target value is below a lower limit value (−300 B) of control, this lower limit value (a value corresponding to this) is output as a parameter d7.

In this manner, the parameter dn is decided in response to this difference value and output when the buffer remaining capacity Bn is within a range of ±300 B from the target value (control range), while the parameter is decided based on the upper limit value or the lower limit value of the control range and output when the buffer remaining capacity is out of the control range on the upper side or the lower side. This is because such a situation should be prevented that variation in the clock frequency appears excessively large and thus the user can feel the frequency variation through his or her sense of hearing.

Also, as described above, the server system 1 transmits a group of packets every 500 ms, but the arrival time to the client system 2 is varied because of transmission delay, or the like. If a time difference of an incoming time of the current packet (a time at which a head packet of the packet group arrives at) from an incoming time of the preceding packet is within ±10% of 500 ms (±50 ms), such incoming time is decided as a normal incoming time and then this check of the buffer remaining capacity is made effective. Thus, the parameter dn is decided based on this check result. In contrast, if the incoming time of the packet group is out of the allowable range, it is decided that a time displacement is large and then a check value of the buffer remaining capacity at this time is not employed. As a result, the erroneous control due to displacement of the incoming time can be prevented.

The above target value and the processing procedures are set similarly in a plurality of client systems 2 shown in FIG. 1.

Thus, an amount of buffer is kept to the almost same value in respective client systems and therefore the same reproducing position of the same audio data can be reproduced at the same reproducing speed in respective client systems.

In other words, variation in a default oscillation frequency of the VCXO 21 in the client systems 2 can be absorbed by the buffer remaining capacity control. As a result, all the client systems 2 can reproduce the audio data in synchronism at the same clock frequency.

Figure 4:
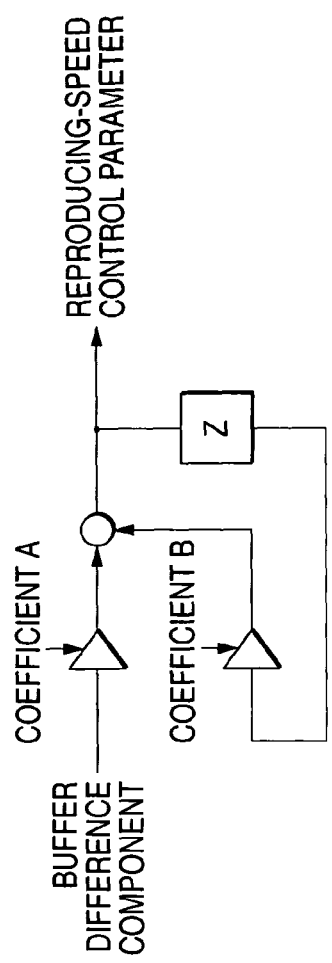
FIG. 4 is a diagram explaining a filtering process executed in the client system.

FIG. 4 is a functional block diagram explaining a filtering process executed by the CPU 20. As described above, the difference component (the value based on this component) of the remaining capacity of the buffer 22 from the target value is used as the parameter to control the frequency of the VCXO 21. In the case where this parameter is input directly into the VCXO 21, the clock frequency is changed discretely and abruptly and thus it is possible that the user feels the unnaturalness through the sense of hearing. For this reason, the filtering process is applied to this difference component (parameter) to give a time constant (inertia) and then the resultant difference component is input into the VCXO 21.

In the filter in FIG. 4, the reproducing speed control parameter to be input into the VCXO 21 at this time is obtained by adding a value obtained by multiplying the current parameter by a coefficient A and a value obtained by multiplying the preceding parameter (output of Z) by a coefficient B.

Figure 6:
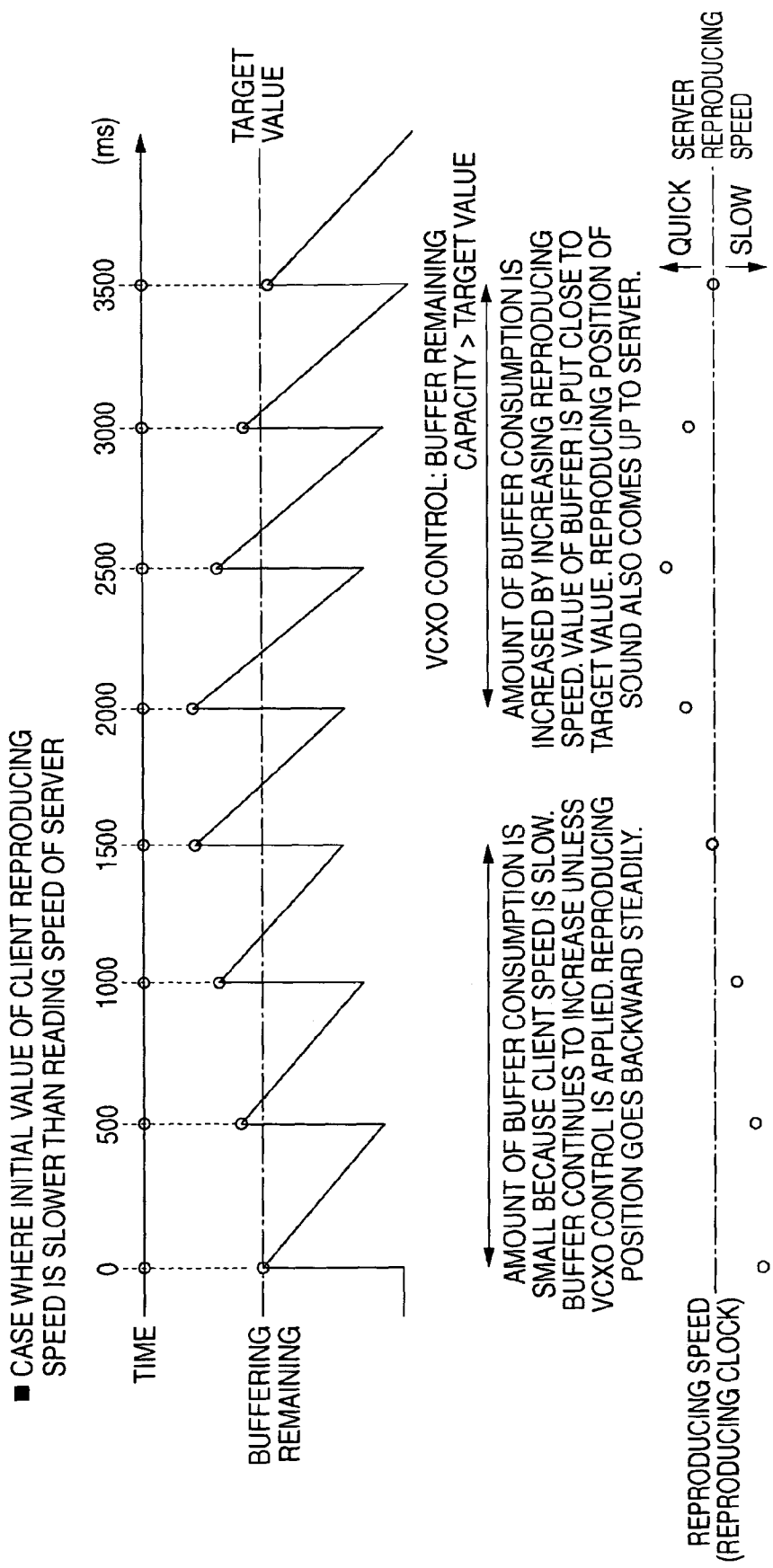
FIG. 6 is a chart showing changes in a buffer remaining capacity and a clock frequency in the client system.

An example of a control mode using the parameter to which the time constant (inertia) is given by the filtering process in FIG. 4 is shown in FIG. 5 and FIG. 6 respectively. In these Figures, explanation will be made of such a situation that a group of packets arrive at the client system exactly every 500 ms.

FIG. 5 shows change in the buffer remaining capacity and change in the clock frequency in the case where the reproducing speed in the client system 2 is quicker than the reading speed in the server system 1. At first, since the reproducing speed is quicker than the reading speed, a quantity of data consumed (reproduced) in the client system is larger than a quantity of data accumulated in the buffer 22, and thus the buffer remaining capacity is reduced gradually. However, the clock frequency oscillated by the VCXO 21 is controlled gradually lower to slow the reproducing speed, and thus a reading amount is reduced. As a result, reduction in the buffer remaining capacity is stopped and the buffer remaining capacity is increased gradually toward the target value.

Also, FIG. 6 shows change in the buffer remaining capacity and change in the clock frequency in the case where the reproducing speed in the client system 2 is slower than the reading speed in the server system 1. At first, since the reproducing speed is slower than the reading speed, a quantity of data consumed (reproduced) in the client system is smaller than a quantity of data accumulated in the buffer 22, and thus the buffer remaining capacity is increased gradually. However, the clock frequency oscillated by the VCXO 21 is controlled gradually higher to quicken the reproducing speed, and thus a reading amount is increased. As a result, increase in the buffer remaining capacity is stopped and then the buffer remaining capacity is reduced gradually toward the target value.

In this manner, since the parameter that is subjected to the filtering process in FIG. 4 is input into the VCXO 21, the clock frequency can be controlled smoothly through the inertial and also the buffer remaining capacity can be converged gently toward the target value.

In the above explanation, the effect that the variation of the clock frequency can be absorbed by converging/maintaining the buffer remaining capacity to/at the target value is explained. Also, displacement of the start timing in the client system 2 can be dissolved by converging the buffer remaining capacity to the target value.

Figure 7:
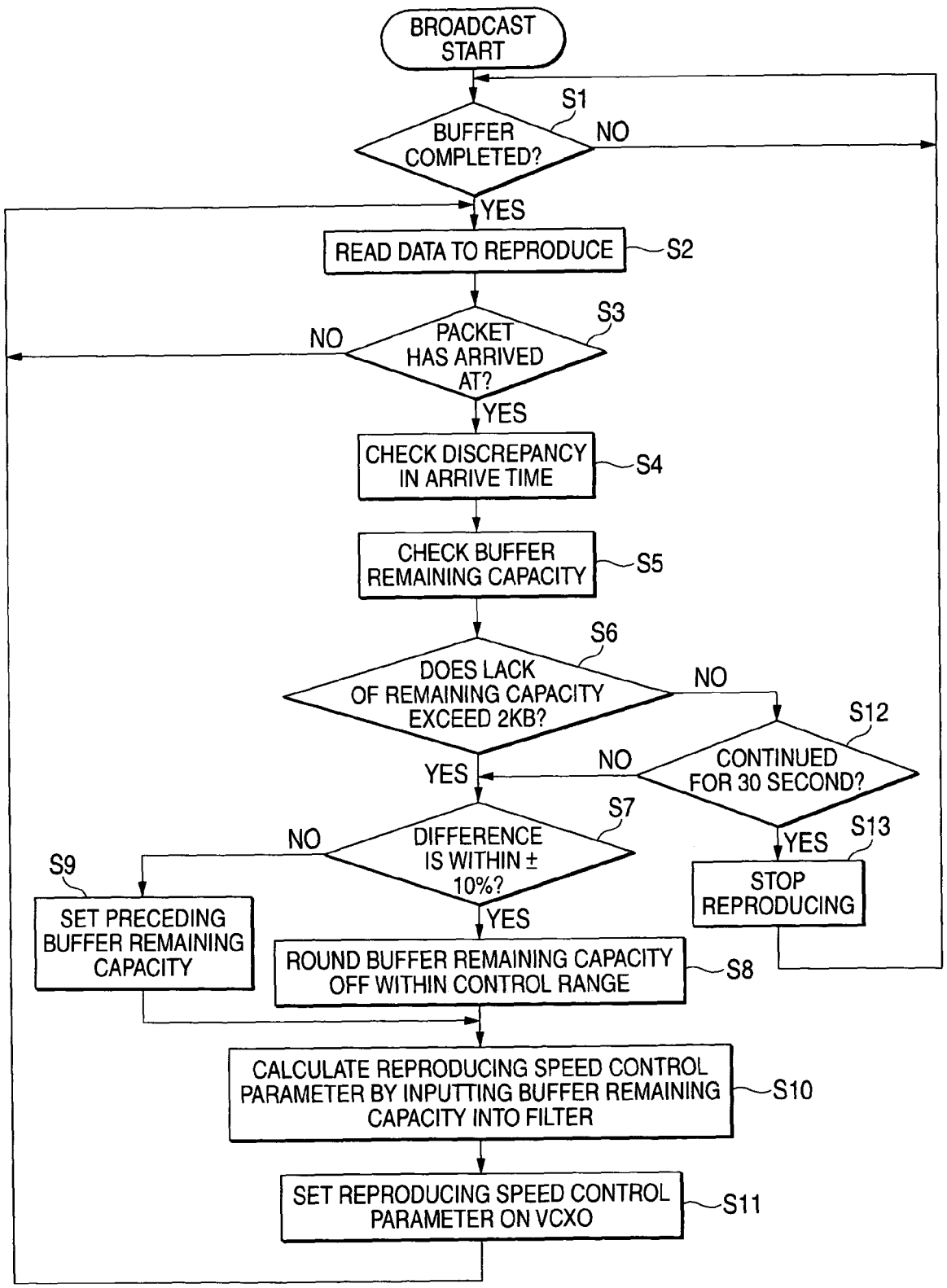
FIG. 7 is a flowchart showing operations of the client system.

FIG. 7 is a flowchart showing operations of the client system 2 in the broadcast mode. If the reproducing is started in the broadcast mode, first only the reception of the audio data is executed without reproducing and the audio data are buffered in the buffer 22 up to B0. If this buffering is completed (s1), the CPU 20 instructs the decoder 23 to read the audio data buffered in the buffer 22 and to start the reproducing (s2).

Then, if a new group of packets arrives at the client system (s3), it is checked to what extent a time difference from the arrive time of the preceding packets is displaced from 500 ms (s4), and also the buffer remaining capacity obtained when the current group of packets is buffered is checked (s5).

Then, in the normal operation, the detected buffer remaining capacity is rounded off within the control range (s8), and the reproducing speed control parameter is calculated by inputting the buffer remaining capacity (parameter based on this capacity) into the filter in FIG. 4 (s10). The rounding process rounds off the value of the buffer remaining capacity within ±300 B not to vary excessively the reproducing speed when the buffer remaining capacity is shifted from the target value to exceed ±300 B (in the case of 160 kbps). Then, the reproducing speed control parameter output from the filter is set on the VCXO 21 (s11).

Meanwhile, if the current incoming time of the packets is displaced from the preceding incoming time of the packets by ±10% or more of the reference interval of 500 ms (s7), the current check result of the buffer remaining capacity is not employed and the preceding buffer remaining capacity is set once again (s9), and then the process goes to the reproducing speed control parameter calculating process in s10. Even though the same buffer remaining capacity is input plural times, the reproducing speed control parameter that is output is varied by the time constant of the filter.

In this case, if the situation that the buffer remaining capacity is 2 kB or more (the data are encoded at 160 kbps) short from the target value is continued for 30 sec or more (s6) (s12), it is decided that to continue to reproduce the audio data that are largely out of the synchronization is not preferable, and the reproducing of the audio data is stopped (s13). Then, the process goes back to s1 wherein the accumulation of the audio data into the buffer 22 is executed once again.

Here, suppose that, in the broadcast mode, each client system 2 can escape independently from the broadcast mode and can issue the request of another music (audio data) to the server system 1 to reproduce.

Consequently, in the explanation of the above embodiment, the client system that receives the broadcast distribution are not always prepared as the entire client systems that are connected to the LAN 3. One or plural client systems out of them may be employed.

In other words, the present invention intends to keep the reproducing synchronization between the client systems that are now receiving the broadcast distribution and the client systems 2 the server system 1.

Of course, the present invention is not limited to the embodiment described above and shown in the drawings, and can be realized by any modification without departing from the scope of the invention.

For example, the data to be produced in synchronism is not limited to the audio data described above, and the present invention can be also applied to any kind of data that is necessary to be reproduced in synchronism.

Further, although in the embodiment, the LAN 3 is employed for a data transmission between the server system 1 and the client systems 2, any other communication methods can be employed, for example, Internet and the like.

What is claimed is:

1. A data reproducing system comprising:
    a server device that streams and outputs streaming data to a network; and
    a plurality of audio reproducing devices, each comprising:
    a receiver that receives the streaming data via the network;
    a buffering device that buffers the received data;
    a clock frequency generator that generates a clock frequency;
    a reproducing unit that reproduces the data by reading the data from the buffering device according to the generated clock frequency; and
    a controller that controls a reproducing speed of the reproducing unit by controlling the clock frequency generator to change the clock frequency in response to excess and deficiency of an amount of buffer from a predetermined target value to maintain the amount of buffer of the buffering device at the target value,
    wherein the respective receivers of the plurality of audio reproducing devices receive the same audio data from the server system, and
    wherein the respective controllers of the plurality of audio reproducing devices control the reproducing speeds of the respective reproducing units using the same target value to maintain the amount of buffer of the respective buffering devices.

2. The data reproducing system according to claim 1, wherein the controller controls the reproducing speed within predetermined upper and lower limits of the reproducing speed even if the excess and deficiency of the amount of buffer is increased.

3. The data reproducing system according to claim 1, wherein the controller stops the reproducing of the reproducing unit when the deficiency of the amount of buffer in the buffering device is in excess of a predetermined value, and keeps reproducing stop until data are buffered in the buffering device to exceed the target value.

4. The data reproducing system according to claim 1, wherein the data includes audio data.

5. A data streaming system comprising:
    a server system that streams and outputs data to a network; and
    a plurality of data reproducing systems each of which includes:
        a receiver that receives the data via the network,
        a buffering device that buffers the received data,
        a clock frequency generator that generates a clock frequency,
        a reproducing unit that reproduces the data by reading the data from the buffering device according to the generated clock frequency, and
        a controller that controls a reproducing speed of the reproducing unit by controlling the clock frequency generator to change the clock frequency in response to excess and deficiency of an amount of buffer from a predetermined target value to maintain the amount of buffer of the buffering device at the target value
    wherein the respective receivers of the plurality of data reproducing systems receive the same audio data from the server system, and
    wherein the respective controllers of the plurality of data reproducing systems control the reproducing speeds of the respective reproducing units using the same target value to maintain the amount of buffer of the respective buffering devices.

6. The data streaming system according to claim 5, wherein the server system streams and outputs the data to the network, and buffers data that correspond to a sum of a target value of the amount of buffer in the client system and a transmission delay time from the server system to the client system and then reproduce the data.

7. The data streaming system according to claim 5, wherein the data includes audio data.

8. The data streaming system according to claim 7, wherein the data is transmitted from the server system to the plurality of data reproducing systems through a wireless local area network.

9. A method of reproducing data by a plurality of audio reproducing devices, each audio reproducing device performing the steps comprising:
    receiving streaming data via a network from a server;
    buffering the received data in a buffering device;
    generating a clock frequency;
    reproducing the buffered data according to the clock frequency; and
    controlling a reproducing speed of the reproduced data by changing the clock frequency in response to excess and deficiency of an amount of buffer from a predetermined target value to maintain the amount of buffer of the buffering device at the target value,
    wherein the step of receiving comprises receiving the same audio data from the server system at each audio reproducing device, and
    wherein the step of controlling comprises controlling the respective reproducing speeds of the audio reproducing devices using the same target value to maintain the amount of buffer of the respective buffering devices.

10. An audio reproducing system comprising:
    a server system that streams and outputs streaming data to a network; and
    a plurality of audio reproducing systems, each comprising:
        a receiver that receives the streaming data via the network;
        a buffering device that buffers the received data;
        a reproducing unit that reproduces the data by reading the data from the buffering device according to a generated clock frequency; and
        a controller that controls a reproducing speed of the reproducing unit in response to excess and deficiency of an amount of buffer from a predetermined target value to maintain the amount of buffer of the buffering device at the target value,
    wherein the receivers of the plurality of audio reproducing systems receives the same audio data from the server system, and
    wherein the controllers of the plurality of audio reproducing systems control the reproducing speeds of the reproducing unit using the same target value to maintain the amount of buffer of the buffering device.

11. The audio reproducing system according to claim 10, wherein the controller of the audio reproducing system controls the reproducing speed within predetermined upper and lower limits of the reproducing speed even if the excess and deficiency of the amount of buffer is increased.

12. The audio reproducing system according to claim 10, wherein the controller of the audio reproducing system stops the reproducing of the reproducing unit when the deficiency of the amount of buffer in the buffering device is in excess of a predetermined value, and keeps reproducing stop until data are buffered in the buffering device to exceed the target value.

13. The audio reproducing system according to claim 10, wherein the server system streams and outputs the data to the network, and buffers data that correspond to a sum of a target value of the amount of buffer in the audio reproducing devices and a transmission delay time from the server system to the client system, and then reproduces the data.

* * * * *